United States Patent [19]

Shimizu et al.

[11] Patent Number: 5,378,775
[45] Date of Patent: Jan. 3, 1995

[54] POLYMER SCALE PREVENTIVE AGENT, POLYMERIZATION VESSEL FOR PREVENTING POLYMER SCALE DEPOSITION, AND PROCESS OF PRODUCING POLYMER USING SAID VESSEL

[75] Inventors: Toshihide Shimizu, Urayasu; Minoru Shigemitsu, Kamisu, both of Japan

[73] Assignee: Shin-Etsu Chemical Co., Ltd., Tokyo, Japan

[21] Appl. No.: 207,107

[22] Filed: Mar. 8, 1994

Related U.S. Application Data

[62] Division of Ser. No. 883,345, May 15, 1992, abandoned.

[30] Foreign Application Priority Data

May 17, 1991 [JP] Japan .................. 3-141209

[51] Int. Cl.$^6$ .................. C08F 2/02; C08F 2/04; C08F 2/22; C08F 2/34; C08F 14/08
[52] U.S. Cl. ........................ 526/62; 526/200; 526/205
[58] Field of Search .................. 526/62, 205, 200

[56] References Cited

U.S. PATENT DOCUMENTS

| | | | |
|---|---|---|---|
| 3,669,946 | 6/1972 | Koyanagi et al. | 526/62 |
| 4,105,838 | 8/1978 | Kitamura et al. | 526/62 |
| 4,105,839 | 8/1978 | Koyanagi et al. | 526/62 |
| 4,142,033 | 2/1979 | Witenhafer | 526/62 |
| 4,143,097 | 3/1979 | Fisher et al. | 526/62 |
| 4,263,421 | 4/1981 | Jones et al. | 526/62 |
| 4,272,622 | 6/1981 | Kitamura et al. | 526/62 |
| 4,933,399 | 6/1990 | Shimizu et al. | 526/62 |
| 5,068,130 | 11/1991 | Decolibus | 526/62 |
| 5,142,003 | 8/1992 | Usuki et al. | 526/62 |
| 5,153,281 | 10/1992 | Shimizu et al. | 526/62 |
| 5,155,004 | 10/1992 | Kojima | 430/226 |
| 5,219,821 | 6/1993 | Arbee et al. | 503/200 |

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A polymer scale preventive agent for use in polymerization of a monomer having an ethylenically unsaturated double bond, comprising (A) a N-substituted leucophenothiazine having the general formula (I):

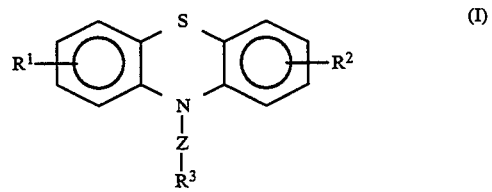

wherein Z is a carbonyl group or a sulfonyl group, $R^1$, $R^2$ and $R^3$ are a hydrogen atom, alkyl group, an amino group, etc., and (B) a water-soluble basic polysaccharide. The agent is used for forming a coating on the inner wall, etc. of a polymerization vessel. Deposition of polymer scale can be effectively prevented, and polymeric product with high whiteness is obtained.

3 Claims, No Drawings

POLYMER SCALE PREVENTIVE AGENT, POLYMERIZATION VESSEL FOR PREVENTING POLYMER SCALE DEPOSITION, AND PROCESS OF PRODUCING POLYMER USING SAID VESSEL

This application is a division of application Ser. No. 07/883,345, filed on May 15, 1992, now abandoned.

BACKGROUND OF THE INVENTION

1. Field of the Invention

The present invention relates to a polymer scale preventive agent useful in polymerization of a monomer having an ethylenically unsaturated double bond, a polymerization vessel for preventing polymer scale deposition, and a process of producing polymer using said vessel.

2. Description of the Prior Art

In processes of preparing polymers by polymerizing a monomer in a polymerization vessel, the problem that polymer deposits on the inner wall surface and so forth in the form of scale, is known. The deposition of the polymer scale on the inner wall results in disadvantages that the yield of the polymer and cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer and operators may be exposed thereto, which may cause physical disorders in the operators.

Heretofore, as methods for preventing polymer scale deposition on the inner wall surface and so forth of a polymerization vessel in polymerization of a monomer having an ethylenically unsaturated double bond, methods in which substances exemplified below are coated on the inner wall surface, etc. as a scale preventive agent, have been known.

For example, particular polar organic compounds (Japanese Patent Publication (KOKOKU) No. 45-30343(1970)), a dye or pigment (Japanese Patent Publication (KOKOKU) No. 45-30835(1970), an aromatic amine compound (Japanese Pre-examination Patent Publication (KOKAI) No. 51-50887(1976)) and a reaction product of a phenolic compound and an aromatic aldehyde (Japanese Pre-examination Patent Publication (KOKAI) No. 55-54317(1980)) are disclosed.

In the meantime, vinyl chloride polymers obtained by polymerization are required to have a good whiteness. That is, when polymeric products such as vinyl chloride polymers are formed or molded with no addition of a coloring agent, the resulting formed or molded product is colored more or less. This coloration is called initial coloration, which is required to be as low as possible. Specifically, for example, the formed or molded products are required to have an L value according to the Hunter's color difference equation, which is described in JIS Z 8730 (1980), of 70 or more.

The prior art polymer scale preventive agents generally include a great number of colored substances as exemplified typically by the dyes and pigments described in Japanese Patent Publication (KOKOKU) Nos. 45-30835(1970) and 52-24953(1977), the aromatic amine compounds described in Japanese Pre-examination Patent Publication (KOKAI) No. 51-50887(1976), and the reaction products of a phenolic compound and an aromatic aldehyde described in Japanese Pre-examination Patent Publication (KOKAI) No. 55-54317(1980). Presumably, for this, a colored polymer is obtained in suspension polymerization and the like of vinyl chloride, etc. in a polymerization vessel which has a coating comprising the polymer scale preventive agent described above formed on its inner wall. That is, according to measurement of the lightness L described above, the L may be measured to be 65 or less, and coloration is thereby confirmed. Presumably, the coloration is caused by incorporation of components of the coating which has dissolved or peeled into the polymerization mass. Improvement is required for producing a polymer of high quality.

In the U.S. patent application Ser. No. 07/780,464 filed on Oct. 22, 1991 by T. Shimizu et al., now abandoned, is disclosed a polymer preventive agent, as one which is effective in producing polymeric products with a low initial coloration, comprising an N-acylated or N-sulfonylated leucophenothiazine having the general formula:

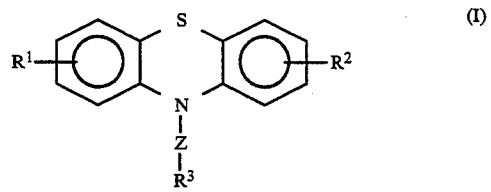

wherein Z is a carbonyl group or a sulfonyl group, $R^1$ and $R^2$ may be the same or different and each represent a hydrogen atom, a hydroxyl group or a group having the formula $-N(R^4)(R^5)$ where $R^4$ and $R^5$ may be the same or different and each represent a hydrogen atom, an alkyl group or a formyl group, and $R^3$ is a hydrogen atom, halogen atom, alkyl group, haloalkyl group, alkoxyl group, aryl group or a group having the formula: $-N(R^6)(R^7)$ where $R^6$ and $R^7$ may be the same or different and each a hydrogen atom or an alkyl group. In the U.S. patent application Ser. No. 07/705,554 filed on May 24, 1991 by T. Shimizu et al., now U.S. Pat. No. 5,153,281 is disclosed a polymer scale preventive agent, as one which is safe and effective in producing polymeric products with a low initial coloration, comprising a water-soluble basic polysaccharide such as chitosans. The present invention relates to an improvement of the agents described in the U.S. applications above in prevention of polymer scale deposition.

SUMMARY OF THE INVENTION

An object of the present invention is to provide a polymer scale preventive agent which is capable of preventing polymer scale deposition effectively, puts no color to polymeric product to thereby produce the polymers with high whiteness, and are not poisonous and therefore causes no concern with respect to safety or sanitation, a polymerization vessel capable of preventing polymer scale deposition using the same preventive agent, and a process of producing a polymer using the polymerization vessel.

Thus, the present invention provides, as a means of attaining said object, a polymer scale preventive agent for use in polymerization of a monomer having an ethylenically unsaturated double bond, comprising:

(A) an N-substituted leucophenothiazine having the general formula (I):

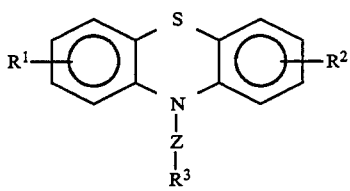

(I)

wherein Z is a carbonyl group or a sulfonyl group, $R^1$ and $R^2$ may be the same or different and each represent a hydrogen atom, a hydroxyl group or a group having the formula —$N(R^4)(R^5)$ where $R^4$ and $R^5$ may be the same or different and each represent a hydrogen atom, an alkyl group or a formyl group, and $R^3$ is a hydrogen atom, halogen atom, alkyl group, haloalkyl group, alkoxyl group, aryl group or a group having the formula: —$N(R^6)(R^7)$ where $R^6$ and $R^7$ may be the same or different and each a hydrogen atom or an alkyl group, and (B) a water-soluble basic polysaccharide.

Further the present invention provides a polymerization vessel having on its inner wall surfaces a coating for preventing deposition of polymer scale, wherein said coating comprises the components (A) and (B) above.

Furthermore, the present invention provides a process of producing a polymer by polymerization of a monomer having an ethylenically unsaturated double bond in a polymerization vessel, comprising the step of carrying out said polymerization in said polymerization vessel having on its inner surfaces said coating, wherein said coating comprises the components (A) and (B), whereby the deposition of polymer scale is prevented.

According to the present invention, high whiteness polymers with an L value of 70 or more can be prepared.

Further, according to the present invention, polymer scale deposition can be effectively prevented, irrespectively of polymerization conditions such as the kind of a monomer or a polymerization initiator, polymerization type, the kind of material constituting the inner wall of polymerization vessels, etc. That is, deposition of polymer scale can be effectively prevented in polymerizations in which polymer scale deposition has been difficult to prevent, e.g., in emulsion polymerization, polymerizations using a polymerization vessel made of stainless steel, or polymerizations using a polymerization initiator with a strong oxidative effect such as potassium peroxodisulfate and the like.

Therefore, if polymerization is carried out under application of the present invention, the operation of removing polymer scale is not necessarily conducted every polymerization run, thereby productivity being improved.

DETAILED DESCRIPTION OF PREFERRED EMBODIMENTS

Polymer scale preventive agent (A) N-Substituted leucophenothiazine

The polymer scale preventive agent of the present invention comprises, as its essential component, an N-substituted leucophenothiazine having the general formula (I), including N-acylleucophenothiazine and N-sulfonylleucophenothiazine, which may be used singly or in combination of the two.

In the general formula (I), preferred examples of the group —$N(R^4)(R^5)$ include, for example, —$NH_2$, —$N(CH_3)_2$, —$N(C_2H_5)_2$, —$N(C_3H_7)_2$, —$N(C_4H_9)_2$ and —$N(CH_3)_3(CHO)$. $R^3$ specifically represents a hydrogen atom, a halogen atom such as Cl, Br I and F, an alkyl group such as methyl, ethyl, propyl and butyl, a haloalkyl group such as dichloromethyl, an alkoxyl group such as methoxyl, ethoxyl, propoxyl and butoxy, and aryl group such as phenyl, p-hydroxyphenyl, p-methoxyphenyl and p-chlorophenyl, and amino groups such as —$NH_2$, —$NH(CH_3)$, —$NH(C_2H_5)$, —$NH(C_3H_7)$ and —$NH(C_4H_9)$.

The N-acylleucophenothiazine is represented by the general formula (II):

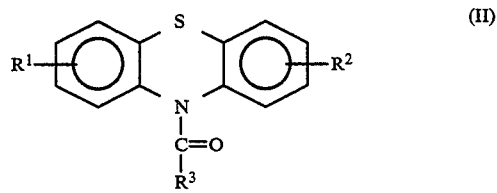

(II)

wherein $R^1$, $R^2$ and $R^3$ are as defined above.

The N-acylleucophenothiazine can be obtained by reducing a phenothiazine compound with hydrosulfite, allowing the resulting product to react with an acyl chloride in the presence of an alkali and washing the product with a suitable solvent, followed by recrystallization.

The N-sulfonylleucophenothiazine is represented by the general formula (III):

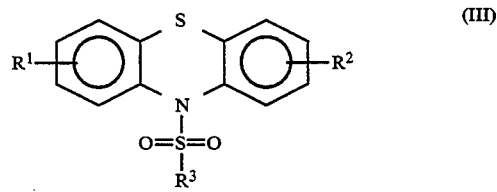

(III)

wherein $R^1$, $R^2$ and $R^3$ are as defined above.

The N-sulfonylleucophenothiazine can be obtained by reducing a phenothiazine compound with hydrosulfite, allowing the resulting product to react with a sulfonyl chloride in the presence of an alkali and washing the product with a suitable solvent, followed by crystallization.

Among the N-substituted leucophenothiazines, particularly preferred are Benzoylmethylene Blue, Hydroxybenzoylmethylene Blue and Sulfonylmethylene Blue.

The N-substituted leucophenothiazines may be used singly or in combination of two or more.

(B) Water-soluble basic polysaccharide

The water-soluble basic polysaccharide used in the present invention includes, for example, chitosans, water-soluble chitosan derivatives, polygalactosamines, water-soluble polygalactosamine derivatives and water-soluble chitin derivatives.

Chitosans are a straight chain polysaccharide, i.e., (poly-1,4-$\beta$-glucosamine), formed by polymerization through $\beta$-1,4 linkage of D-glucosamine. It can be obtained by deacetylization of chitin contained in the carapace of the Crustacea such as prawns, shrimps and crabs. Recently a chitosan can be produced by culturing a mold, and the chitosan thus produced can be used in the same manner as those naturally occurring. The chitosans are insoluble in water under the neutral conditions, but soluble under the acidic conditions; hence the chitosans are used under a pH of less than 7.

The water-soluble chitosan derivatives which may be used in the present invention include the following:

(1) Organic acid salts and inorganic acid salts of chitosans. The organic acid specifically includes, for example, acetic acid, glycollic acid, malic acid, citric acid, and ascorbic acid. The inorganic acid includes, for example, hydrochloric acid, sulfuric acid, nitric acid and phosphoric acid. Chitosans preferably have a deacetylization degree of 40 to 100%.

(2) Water-soluble low molecular products obtained by decomposition of chitosans, i.e., water-soluble glucosamine oligomers. Normally, 5 to 20-mers of glucosamine are preferred. Such oligomers can be produced by conventional depolymerization methods, for example, the hydrochloric acid hydrolysis method (Japanese pre-examination patent publication (KOKAI) No. 61-21102(1986), the nitrate decomposition method (Japanese pre-examination patent publication (KOKAI) No. 62-184002(1987), the chlorine decomposition method (Japanese pre-examination patent publication (KOKAI) No. 60-186504(1985), the phosphoric acid decomposition method and decomposition methods using an enzyme or microorganism.

(3) Water-soluble derivatives of chitosans prepared by introducing a hydrophilic group thereinto. Examples are described in Japanese pre-examination patent publication (KOKAI) No. 63-14714(1988) and include polyoxyethylene chitosans, polyoxypropylene chitosans, phosphated chitosans, N-glycidyltrimethylammonium chitosans, and dihydropropylchitosans.

The polygalactosamines which may be used in the present invention are insoluble in water under neutral conditions, but soluble under a pH of 7 or less and therefore used under such conditions. Polygalactosamines can be produced by culturing a mold (APPLICATION OF CHITIN AND CHITOSAN pp. 24–26, Edited by Society for Research of Chitin and Chitosan, 1990, published by Giho-do Shuppan).

The water-soluble polygalactosamines include the following:

(1) Organic acid salts and inorganic acid salts of polygalactosamines including salts of organic acids such as acetic acid, formic acid or the like, and salts of inorganic acids such as hydrochloric acid, nitric acid or the like;

(2) Water-soluble low molecular products obtained by decomposition of polygalactosamines. Normally, 5 to 20-mers of galactosamine are preferred. Such oligomers can be produced by decomposition methods using an enzyme or microorganism.

The water-soluble chitin derivatives which may be used in the present invention, include the following:

(1) Water-soluble N-acetylglucosamine oligomers obtained by decomposition of chitins. Normally, 5 to 20-mers are preferred. Such oligomers can be produced by conventional depolymerization methods, for example, the nitrous acid decomposition method, the formic acid decomposition method, the chlorine decomposition method (Japanese pre-examination patent publication (KOKAI) No. 62-186504(1987)) or decomposition methods using an enzyme (e.g., chittinase) or a microorganism.

(2) Water-soluble derivatives of chitins prepared by introducing a hydrophilic group thereinto. Examples are described in Japanese pre-examination patent publication (KOKAI) No. 63-14714(1988) and include polyoxyethylene chitins, polyoxypropylene chitins, phosphated chitins and dihydropropylchitins.

Among the water-soluble basic polysaccharides described above, preferred are the inorganic acid salts and organic acid salts of chitosans, having a deacetylization degree of 65% or more and a viscosity at 20° C. in the form of an aqueous solution containing 0.5% by weight of the chitosan and 0.5% by weight of acetic acid of 30 cP or lower when measured with a B-type viscometer, and the organic or inorganic salts of polygalactosamines with a moleculare weight of 10,000 or more.

The water-soluble basic polysaccharides may be used singly or in combination of two or more.

The preferred combinations of the components (A) and (B) include those specifically described in Examples later.

According to the present invention, the use of the water-soluble basic polysaccharide (B) in combination with the N-substituted leucophenothiazine (A) provides a marked scale preventing effect even if the concentration of the latter is low. The mechanism of the action due to the water-soluble basic polysaccharide is not clear. Presumably, the action is caused because the water-soluble basic polysaccharide (B) affects the N-substituted leucophenothiazine (A), thereby increasing the hydrophilic nature thereof.

The amount of the water-soluble basic polysaccharide (B) in the polymer scale preventive agent of the present invention ranges normally from 0.1 to 1,000 parts by weight, preferably 1 to 600 parts by weight, per 100 parts by weight of the component (B). If the amount of the water-soluble basic polysaccharide (B) is too small or too large relative to the component (A), improvement in scale preventing effect due to the combined use of the components (A) and (B) is hardly obtained.

The polymer scale preventive agent of the present invention is used for preventing polymer scale deposition on the inner wall surfaces, etc. of a polymerization vessel, for example, by being used for forming a coating thereon.

The amount of the component (B) in the polymer scale preventive agent of the present invention ranges normally from 0.1 to 1,000 parts by weight, preferably 1 to 600 parts by weight, per 100 parts by weight of the amount of the component (A). If the amount of the water-soluble basic polysaccharide (B) is too small or too large, improvement in scale preventing effect due to the combined use of the components (A) and (B) is lowered.

The polymer scale preventive agent is used for forming a coating on the inner wall surfaces, and preferably the surfaces of parts with which monomer comes into contact during polymerization, e.g., a stirring shaft, stirring blades, baffles, condensing coils, etc. of a polymerization vessel, so that scale deposition in the vessel can be prevented. Normally, in forming said coating on the inner wall surfaces, etc. of a polymerization vessel, the polymer scale preventive agent is used in a liquid state, i.e., as a coating liquid.

Preparation of a coating liquid

The coating liquid mentioned above is prepared by dissolving or dispersing said components (A) and (B) in a solvent.

The solvents used for preparation of the coating solution include, for example, water; alcohols such as methanol, ethanol, propanol, butanol, 2-butanol, 2-methyl-1- propanol, 2-methyl-2-propanol, 3-methyl-1-butanol, 2-methyl-2-butanol, 2-pentanol, etc.; ketones such as acetone, methyl ethyl ketone, methyl isobutyl ketone, etc.; esters such as methyl formate, ethyl formate, methyl acetate, methyl acetoacetate, etc.; ethers such as 4-methyldioxolane, ethylene glycol diethyl ether, etc.; furans; and aprotic solvents such as dimethylformamide, dimethyl sulfoxide, acetonitrile, etc. These solvents may be used singly or as a mixed solvent of two or more thereof as appropriate.

The total concentration of the components (A) and (B) is not limited as long as the coating weight described later can be obtained, and it is normally in the range from 0.001 to 15% by weight, preferably from 0.01 to 1% by weight.

To the coating liquid, for example, a cationic surfactant, a nonionic surfactant, an anionic surfactant, and so forth can be added as long as the scale preventing effect is not impaired.

Further, inorganic compounds can be added to the coating liquid suitably as long as the low coloring property or the scale preventing effect is not impaired. The inorganic compounds which may be added include, for example, silicic acids or silicates such as orthosilicic acid, metasilicic acid, mesodisilicic acid, mesotrisilicic acid, mesotetrasilicic acid, sodium metasilicate, sodium orthosilicate, sodium disilicate, disilicate, sodium tetrasilicate and water glass; metallic salts such as oxygen acid salts, acetates, nitrates, hydroxides or halides of a metal selected from alkali earth metals such as magnesium, calcium, and barium, zinc family metals such as zinc, aluminum family metals such as aluminum, and platinum family metals such as platinum; and inorganic colloids such as ferric hydroxide colloid, colloidal silica, colloid of barium sulfate, and colloid of aluminum hydroxide. The above-mentioned inorganic colloids may be those prepared, for example, by mechanical crushing, irradiation with ultrasonic wave, electrical dispersion or chemical methods.

Formation of coating

When the coating liquid prepared as described above is used for forming a coating on the inner wall surface of a polymerization vessel, first, the coating liquid is applied to the inner wall surface and then dried sufficiently, followed by washing with water if necessary. A coating is formed by these operations on the inner wall surface of the polymerization vessel; hence the polymer scale deposition thereon can be prevented.

The above-mentioned coating is preferably formed on not only the inner wall surfaces of a polymerization vessel but also other parts with which the monomer comes into contact during polymerization. For example, it is preferred to form the coating by applying said coating liquid on a stirring shaft, stirring blades, condensers, headers, search coil, bolts, nuts, etc.

More preferably, the coating is formed on not only the parts with which the monomer comes into contact during polymerization but also other parts on which polymer scale may deposit, for example, such as the inner surfaces of equipment and tubes of recovery system for unreacted monomer. These parts, more specifically, are exemplified by the inner wall surfaces of monomer distillation columns, condensers, monomer stock tanks and valves, etc. in said recovery system.

The method of applying the coating liquid on the inner wall surface, etc. of a polymerization vessel is not particularly limited, and includes, for example, the brush coating, spray coating, the method of filing the polymerization vessel, etc. with the coating liquid followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surface provided by application of the coating liquid, is not limited, either. The drying is conducted preferably at a temperature within the range from room temperature to 100° C., typically 30° C. to 80°. Specifically, a method in which, after the liquid is applied, hot air with a suitable elevated temperature is blown to the coated surface, and a method in which the inner wall surface of a polymerization vessel and the surfaces of other parts to be coated are previously heated at, e.g., 30°–80° C. and the coating liquid is directly applied to the heated surfaces, etc. After dried, the coated surfaces are washed with water if necessary.

The coating thus formed has normally a coating weight of 0.001 g/m$^2$ or more, preferably from 0.05 to 2 g/m$^2$.

The above coating operation may be conducted every 1 to ten-odd batches of polymerization. The formed coating has fairly good durability and retains the polymer scale-preventing action; therefore the coating operation is not necessarily performed for every batch of polymerization. Hence, the productivity of the manufactured polymer is improved.

Polymerization

After forming the coating on the inner wall surfaces of a polymerization vessel and other parts with which monomer may come into contact by application of the coating liquid, polymerization is carried out in accordance with conventional procedures therein. That is, a monomer having an ethylenic double bond and a polymerization initiator (catalyst) are charged, and then, a polymerization medium such as water, etc. and, optionally, a dispersing agent such as suspension agents, solid dispersing agents, and nonionic and anionic emulsifying agents, etc. are charged, followed by carrying out polymerization according to conventional methods.

The monomer having an ethylenic double bond to which the method of this invention can be applied includes, for example, vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; and diene monomers such as butadiene, chloroprene and isoprene; aromatic vinyl compounds such as styrene; as well as acrylonitrile, halogenated vinylidenes, and vinyl ethers.

There are no particular limitations on the type of polymerization to which the method of this invention can be applied. The present invention is effective in any types of polymerization such as suspension polymerization, emulsion polymerization, solution polymerization, bulk polymerization, and gas phase polymerization. Particularly, the present method is suitable to polymerizations in an aqueous medium such as suspension or emulsion polymerization.

Specifically, in the case of suspension polymerization and emulsion polymerization, polymerization is generally performed as follows, for instance.

First, water and a dispersing agent are charged into a polymerization vessel, and thereafter a polymerization initiator is charged. Subsequently, the inside of the polymerization vessel is evacuated to a pressure of from about 0.1 to about 760 mmHg, and a monomer is then charged (whereupon the pressure inside the polymerization vessel usually becomes from 0.5 to 30 kgf/cm². G). Then, the polymerization is normally carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization may be carried out at 30° to 80° C.; in the case of polymerizing styrene, polymerization may be carried out at 50° to 150° C. The polymerization may be judged to be completed when the pressure inside the polymerization vessel falls to from about 0 to 7 kgf/cm². G or when cooling water which passes through a jacket provided around the polymerization vessel indicates almost the same temperature at the inlet where it is charged and at the outlet where it is discharged (i.e., when liberation of heat due to polymerization reaction has been completed). The water, dispersing agent and polymerization initiator charged for the polymerization are used in amounts of about 20 to 500 parts by weight, about 0.01 to 30 parts by weight, and about 0.01 to parts by weight, respectively, per 100 parts by weight of the monomer.

In the case of solution polymerization, an organic solution such as toluene, xylene, pyridine and the like is used as a polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged, and then polymerization is carried out at a temperature of from −10° C. to 250° C. For example, in the case of polymerizing vinyl chloride, polymerization is carried out at a temperature of from 30° C. to 80° C.; and in the case of polymerizing styrene, polymerization may be carried out at 50° C. 150° C.

The present invention is effective in preventing polymer scale from depositing, independent of materials constituting the inner wall, etc. of a polymerization vessel. For example, this invention is effective in preventing polymer scale from depositing in polymerization vessels made of a stainless steel or other steels or vessels lined with glass.

Any additive materials that have been added in a polymerization system can be used without any limitation. More specifically, the method of this invention can effectively prevent polymer scale from depositing, even in polymerization systems containing the following additives: for example, polymerization initiators such as t-butyl peroxyneodecanoate, bis (2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis (2-ethylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-methane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutylthin dilaurate and dioctyltin mercaptide; lubricants such as rice wax, stearic acid and cetyl alcohol; plasticizers such as DOP and DBP; chain transfer agents such as trichloroethylene and mercaptans as exemplified by t-dodecyl mercaptans; and pH adjusters.

Addition to polymerization system

The polymer scale preventive agent of the present invention may be added into a polymerization medium in addition to the formation of the coating, so that the scale preventing effect is further improved. The amount of the polymer scale preventive agent to be added into the polymerization medium, preferably ranges from about 10 ppm to 1,000 ppm based on the whole weight of the monomer charged. The addition should be conducted so that it may not affect the quality of polymeric product to be obtained with respect to fish eyes, bulk density, particle size distribution, etc.

EXAMPLES

The present invention is now described in detail by way of working examples and comparative examples. In each of the tables below, Experiments of Nos. marked with * are comparative examples, and the other Experiments working examples of the present invention. Chitosans used as the component (B) in Examples 1 and 2 below are those described in Table 1.

TABLE 1

| Chitosan[3] | Viscosity[1] | Deacetylization degree[2] | Manufacturer |
|---|---|---|---|
| Chitosan (CHL) | 100 cP or more | 80.0% or more | Yaizu Suisankagaku Kogyo K.K. |
| Chitosan (PSH) | 100 cP or less | 80.0% or more | Yaizu Suisankagaku Kogyo K.K. |
| Chitosan (PSL) | 100 cP or less | 80.0% or more | Yaizu Suisankagaku Kogyo K.K. |
| Chitosan (90M) | 100 to 300 cP | 85.0 to 94.9% | Wako Junyaku Kogyo K.K. |
| Chitosan (100L) | 30 to 100 cP | 99.0% or more | Wako Junyaku Kogyo K.K. |
| Chitosan (70H) | 300 to 500 cP | 65.0 to 79.4% | Wako Junyaku Kogyo K.K. |
| Chitosan (80H) | 300 to 500 cP | 75.0% to 84.9% | Wako Junyaku Kogyo K.K. |

Remarks:
[1]Viscosity: Measured at 20° C. with a B-type viscometer for a 0.5 wt. % chitosan solution which was prepared by dissolving a chitosan in an aqueous 0.5 wt. % acetic acid solution.
[2]Deacetylization degree: Measured by the PVSK colloid solution titration method.
[3]Tradenames are indicated in parentheses.

EXAMPLE 1 polymerization was carried out in the following manner using a polymerization vessel with an inner capacity of 1,000 liters and having a stirrer.

In each experiment, first, a component (A) (N-substituted leucophenothiazine), a component (B) (water-soluble basic polysaccharide) were dissolved in a solvent so that the total concentration thereof might become the value given in Table 2, prepare a coating liquid. The coating liquid was applied to the inner wall and other parts with which a monomer comes into contact including the stirring shaft, stirring blades and baffles, followed by drying under heating at 40° C. for 15 min. to form a coating, which was then washed with water.

In preparation of the coating liquids containing a water-soluble basic polysaccharide, the water-soluble polysaccharide was dissolved in an aqueous ascorbic acid solution to form a polysaccharide solution, which was then diluted with methanol and the diluted solution was mixed with a component (A) dissolved in a solvent.

Experiment of No. 101 is a comparative example in which no coating liquid was applied, and Nos. 102 and 103 are comparative examples in which coating liquids that contained either the component (A) or (B).

The N-substituted leucophenothiazine (A), the kind of the water-soluble basic polysaccharide (B), the total concentration of the components (A) and (B), the weight ratio of (A)/(B), and the solvent used in each experiment are given in Table 2.

Subsequently, in the polymerization vessel in which a coating had been formed by the coating operation as above, were charged 400 kg of water, 200 kg of vinyl chloride, 250 g of a partially saponified polyvinyl alcohol, 25 g of hydroxypropylmethyl cellulose and 75 g of diisopropyl peroxydicarbonate. Then, polymerization was carried out at 57° C. with stirring for 6 hours. After the completion of the polymerization, the amount of polymer scale depositing on the inner wall of the polymerization vessel and the whiteness or initial coloration of the polymer obtained were measured according to the following.

The scale depositing on the inner wall surface in an area of 10 cm square were scraped off with a stainless steel spatula as completely as possible to be confirmed with naked eyes, and then the scraped scale was weighted on a balance. Thereafter, the amount of the deposited scale per area of 1 m² was obtained by multiplying the measured value by 100.

Measurement of initial coloration of polymer

A hundred parts by weight of a polymer, one part by weight of a tin laurate stabilizing agent (trade name: TS-101, product of Akishima Chemical Co.) and 0.5 part by weight of a cadmium stabilizing agent (trade name: C-100 J, product of Katsuta Kako Co.), and 50 parts by weight of a plasticizer DOP were kneaded at 160° C. for 5 min. with a twin roll mill, and then formed into a sheet 1 mm thick. Subsequently, this sheet was placed in a mold measuring 4 cm × 4 cm × 1.5 cm (thickness), and molded under heating at 160° C. and under a pressure of 65 to 70 kgf/cm² to prepare a test specimen. This test specimen was measured for luminosity index L in the Hunter's color difference equation described in JIS Z 8730 (1980). Initial coloration is evaluated to be more favorable with increase in L value.

The L value was determined as follows.

The stimulus value Y of XYZ color system was determined according to the photoelectric tristimulus colorimetry using the standard light C, a photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 was adopted. Next, L was calculated based on the equation: $L = 10Y^{\frac{1}{2}}$ described in JIS Z 8730(1980).

The results are given in Table 2.

TABLE 2

| Exp. No. | (A) N-Substituted leucophnothiazine | (B) Basic polysaccharide | Total conc. of (A) + (B) (wt. %) | Wt. ratio (A)/(B) | Solvent (wt. ratio) | Amount of scale (g/m²) | L |
|---|---|---|---|---|---|---|---|
| 101* | — | — | — | — | — | 1300 | 73 |
| 102* | — | Chitosan (PSH) | 0.2 | 0/100 | Methanol/Water (75/25) | 15 | 73 |
| 103* | 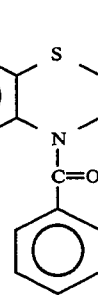 | — | 0.05 | 100/0 | Methanol | 8 | 73 |
| 104 | | Chitosan (PSH) | 0.05 | 100/400 | Methanol/Water (90/10) | 0 | 72 |
| 105 | | Chitosan (100L) | 0.05 | 100/900 | Methanol/Water (90/10) | 0 | 72 |
| 106 | | Chitosan (70H) | 0.1 | 100/1900 | Methanol/Water (70/30) | 0 | 71 |

TABLE 2-continued

| Exp. No. | (A) N-Substituted leucophnothiazine | (B) Basic polysaccharide | Total conc. of (A) + (B) (wt. %) | Wt. ratio (A)/(B) | Solvent (wt. ratio) | Amount of scale (g/m²) | L |
|---|---|---|---|---|---|---|---|
| 107* | (structure: N-substituted leucophenothiazine with N-SO₂-phenyl group, 3,7-bis(dimethylamino)) | — | 0.05 | 100/0 | Methanol/Water (30/70) | 9 | 73 |
| 108 | | Chitosan (PSL) | 0.05 | 100/230 | Methanol/Water (50/50) | 1 | 71 |
| 109 | | Chitosan (90L) | 0.1 | 100/900 | Methanol/Water (70/30) | 0 | 72 |
| 110 | | Chitosan (70H) | 0.2 | 100/900 | Methanol/Water (70/30) | 1 | 72 |

*Comparative examples

EXAMPLE 2

In each experiment, the coating procedure of Example 1 was repeated for a stainless steel polymerization vessel having an inner capacity of 20 liters and equipped with a stirrer, except that a coating liquid in which the N-substituted leucophenothiazine (A), the water-soluble basic polysaccharide (B), the total concentration of the components (A)+(B), the weight ratio of (A)/(B), and the solvent were as given in Table 3, was used. Experiment of No. 201 is a comparative experiment in which no coating liquid was applied, and Experiment Nos. 202 and 203 are comparative experiments in which coating liquids that contained either the components (A) or (B) were used.

In preparation of the coating liquids containing a water-soluble basic polysaccharide, the water-soluble polysaccharide was dissolved in an aqueous glycollic acid solution to form a polysaccharide solution, which was then diluted with methanol and the diluted solution was mixed with a component (A) dissolved in a solvent.

In the polymerization vessel in which the coating was thus formed, were charged 9 kg of water, 225 g of sodium dodecylbenzenesulfonate, 12 g of t-dodecyl mercaptan, and 13 g of potassium peroxodisulfate. After the inner atmosphere was replaced with a nitrogen gas, 1.3 kg of styrene and 3.8 kg of butadiene were charged, followed by polymerization at 50° C. for 20 hours.

After completion of the polymerization, the amount of polymer scale depositing on the inner wall surface was measured.

The results are given in Table 3.

TABLE 3

| Exp. No. | (A) N-Substituted leucophnothiazine | (B) Basic polysaccharide | Total conc. of (A) + (B) (wt. %) | Wt. ratio (A)/(B) | Solvent (wt. ratio) | Amount of scale (g/m²) |
|---|---|---|---|---|---|---|
| 201* | — | — | — | — | — | 400 |
| 202* | — | Chitosan (70H) | 0.2 | 0/100 | Methanol/Water (75/25) | 20 |
| 203* | (structure: N-substituted leucophenothiazine with N-C(=O)-phenyl group, 3,7-bis(dimethylamino)) | — | 0.2 | 0/100 | Methanol | 8 |
| 204 | | Chitosan (70H) | 0.1 | 100/25 | Methanol/Water (80/20) | 4 |
| 205 | | Chitosan (80H) | 0.1 | 100/230 | Methanol/Water (90/10) | 4 |
| 206 | | Chitosan (PSH) | 0.1 | 100/100 | Methanol/Water (90/20) | 3 |

*Comparative examples

We claim:

1. A process of producing a polymer by polymerization of a monomer having an ethylenically unsaturated double bond in a polymerization vessel, comprising the step of carrying out said polymerization in a polymerization vessel having on its inner wall surfaces a coating for preventing polymer scale deposition, wherein the coating comprises:

a solution or dispersion of (A) an N-substituted leucophenothiazine having the formula (I):

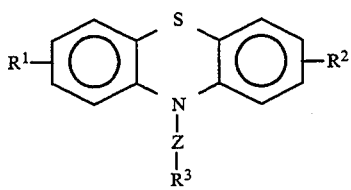

wherein Z is a carbonyl group or a sulfonyl group, $R^1$ and $R^2$ may be the same or different and each represent a hydrogen atom, a hydroxyl group or a group having the formula $-N(R^4)(R^5)$ where $R^4$ and $R^5$ may be the same or different and each represent a hydrogen atom, an alkyl group or a formyl group, and $R^3$ is a hydrogen atom, halogen atom, alkyl group, haloalkyl group, alkoxy group, aryl group or a group having the formula: $-N(R^6)(R^7)$ where $R^6$ may be the same or different and each represent a hydrogen atom or an alkyl group, and (B) a water-soluble basic polysaccharide which is a chitosan, water-soluble chitosan derivative, polygalactosamine, water-soluble polygalactosamine derivative or water-soluble chitin, in a solvent.

2. The process according to claim 1, wherein said polymerization is carried out as suspension polymerization, emulsion polymerization, solution polymerization, bulk polymerization, or gas phase polymerization.

3. The process according to claim 1, wherein said monomer is selected from the group consisting of vinyl halides; vinyl esters; acrylic acid, methacrylic acid and esters and salts thereof; maleic acid and fumaric acid, and esters and anhydrides thereof; diene monomers; aromatic vinyl compounds; acrylonitrile; halogenated vinylidenes; and vinyl ethers.

* * * * *